United States Patent
Keller et al.

(10) Patent No.: US 8,075,266 B2
(45) Date of Patent: Dec. 13, 2011

(54) METHOD AND APPARATUS FOR ROTATING A COMPONENT OF A WIND ENERGY PLANT

(75) Inventors: Harald Keller, Hamburg (DE); Lars-Ulrich Wiese-Müller, Pinneberg (DE); Eberhard Voβ, Jörnstorf (DE)

(73) Assignee: Nordex Energy GmbH, Norderstedt (DE)

( * ) Notice: Subject to any disclaimer, the term of this patent is extended or adjusted under 35 U.S.C. 154(b) by 528 days.

(21) Appl. No.: 12/389,052

(22) Filed: Feb. 19, 2009

(65) Prior Publication Data

US 2009/0232652 A1    Sep. 17, 2009

(30) Foreign Application Priority Data

Mar. 12, 2008   (DE) .......................... 10 2008 013 864

(51) Int. Cl.
*F01D 7/00* (2006.01)
*B63H 3/00* (2006.01)
*B64C 11/00* (2006.01)
*B64C 27/00* (2006.01)
*F03B 7/00* (2006.01)

(52) U.S. Cl. ........................................................ 416/37
(58) Field of Classification Search ................... 416/31, 416/32, 37
See application file for complete search history.

(56) References Cited

U.S. PATENT DOCUMENTS

| 5,035,575 A | 7/1991 | Nielsen et al. |
| 2005/0175451 A1 | 8/2005 | Wobben |

FOREIGN PATENT DOCUMENTS

| CH | 660 101 | 12/1978 |
| DE | 199 20 504 A1 | 8/2000 |
| DE | 10127102 | 12/2002 |
| DE | 103 58 486 A1 | 7/2005 |
| DE | 102007049368 | 5/2008 |
| DE | 1 290 232 | 1/2010 |
| EP | 0 428 783 A1 | 11/1989 |
| FR | 2120447 | 8/1972 |
| GB | 399223 | 10/1933 |

OTHER PUBLICATIONS

"Wind Turbines—Fundamentals, Technologies, Application, Economic", by Eric Hau, 2nd Edition, Spring Verlag pp. 12-315. (2nd Edition is same as 3rd Edition cited in application).

*Primary Examiner* — Jenny L Wagner
(74) *Attorney, Agent, or Firm* — Vidas, Arrett & Steinkraus, P.A.

(57) ABSTRACT

The invention is related to a method for rotating a component of a wind energy plant by traversing an adjustment device, wherein the adjustment device comprises at least two adjustment drives, each one thereof having at least one electric motor, for traversing the adjustment device, and wherein during the traversing of the adjustment device, the electric motor of at least one of the at least two adjustment drives is operated at another rotational speed than the electric motor of at least one other of the at least two adjustment drives. Furthermore, the invention is related to a corresponding device.

30 Claims, 2 Drawing Sheets

METHOD AND APPARATUS FOR ROTATING A COMPONENT OF A WIND ENERGY PLANT

CROSS-REFERENCE TO RELATED APPLICATIONS

Figure 1:
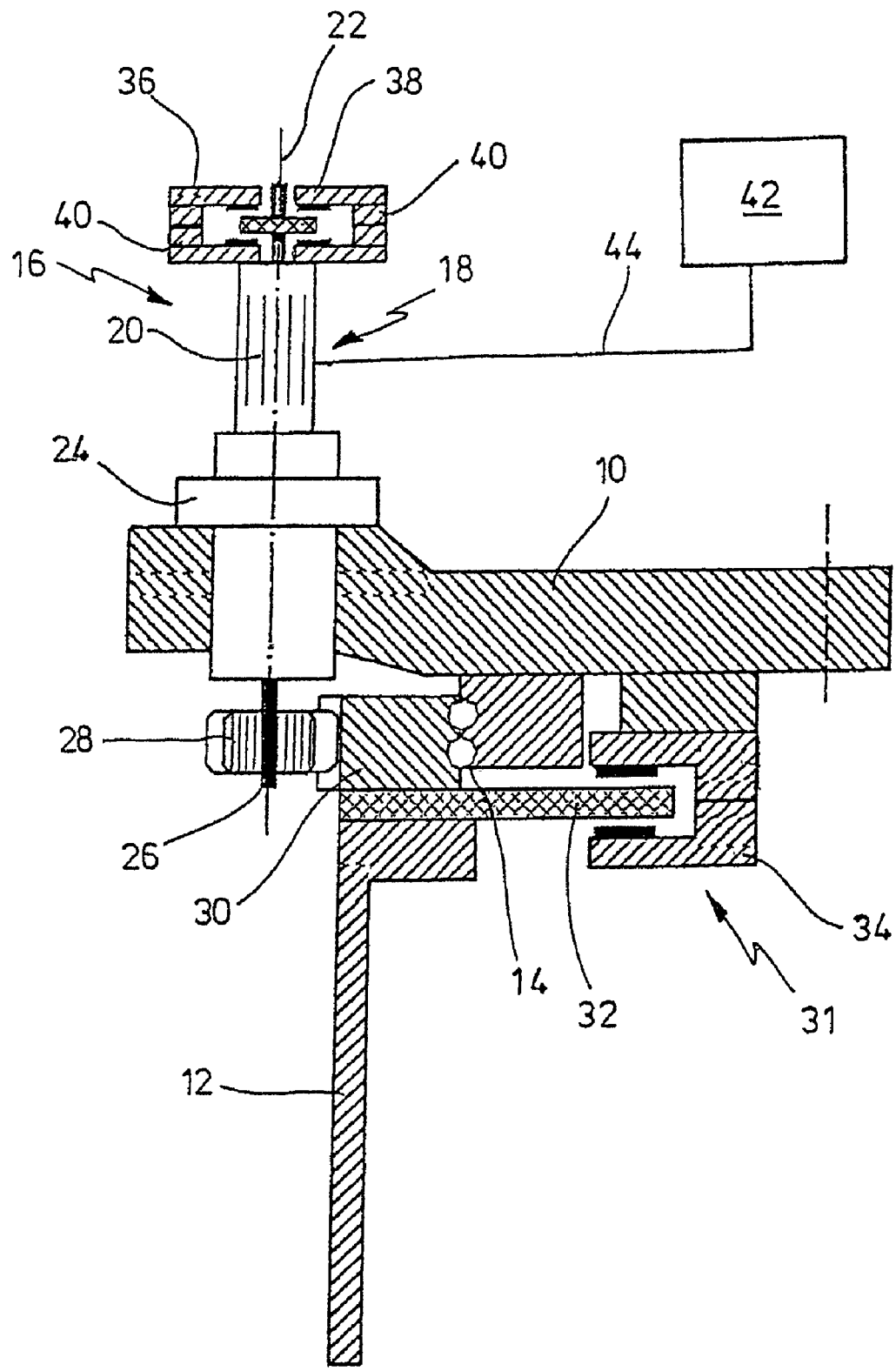

Not applicable.

STATEMENT REGARDING FEDERALLY SPONSORED RESEARCH

Not applicable.

BACKGROUND OF THE INVENTION

The present invention is related to a method and an apparatus for rotating a component of a wind energy plant by traversing an adjustment device. Adjustment devices are used in wind energy plants for rotating various components. A known example is the blade pitch angle adjustment device, by which the blade pitch angle of the rotor blades of the plant is adjusted. By doing so, the rotor blades are rotated around their longitudinal axes. Such a blade pitch angle adjustment device is usually a part of a so-called pitch regulation. Another also known example are azimuth adjustment devices, by which the machine house of the wind energy plant is rotated around the longitudinal axis of the tower. Such azimuth adjustment devices form a part of a so-called azimuth system of the wind energy plant, which has the objective to orient the machine house or the nacelle of the wind energy plant, respectively, at optimum to the wind direction, and to untwist the lines running between the tower of the plant and the machine house (the cable loop) from time to time. Such azimuth systems are known from Erich Hau, Windkraftanlagen, Springer Verlag, 3th edition, page 309ff., for instance, the entire contents of which is incorporated herein by reference.

Normally, the adjustment devices feature one or more adjustment drives. In azimuth adjustment drives, for instance, a planetary gearbox, a motor, an electric motor for instance, and a braking device, an electric brake for instance, is usually provided. In this, the output gear pinion of the gearbox meshes with the toothing of an azimuth swing bearing. The torques and the rotational speeds are geared up or down via toothings in the gearboxes. In the operation, the adjustment devices are exposed to changing dynamic loads, from the attacking wind in particular. In this, elasticities in the drives are generated, as a consequence of which the adjustment devices cannot instantaneously react on the exterior loads, or cannot suddenly apply a demanded driving torque, respectively. The elasticity of gearboxes depends on the tooth clearance of the individual tooth engagements. The more tooth engagements are used for the gearbox transformation, and the greater the respective tooth clearance is, the greater is the elasticity of the gearbox. In azimuth drives for instance, at a tightening up to the rated torque, the elasticity can amount up to ten rotations of the fast shaft of a four-step planetary gearbox. In the traversing of the adjustment devices, small partial moments are conventionally also distributed to the swing bearing or to the braking device used for holding the azimuth system, respectively, to the brake calipers in particular.

The driving torque of the adjustment drives is dimensioned for cases of high load, wherein the adjustment device experiences a change of the rotational speed when these cases of load are exceeded, when it is braked down or accelerated in particular. Furthermore, in the changes of the operation condition, namely holding after travelling and travelling after holding, load takeovers have to be realised which can lead to a decrease of the common driving/holding moment. These dropdowns of the moment can have various reasons:

When the wind loads require a change between driving and braking loads, the driving torque of the adjustment drives drops down, because the drives must retorque themselves anew over several rotations due to the existing elasticities. In addition, the adjustment drives, the azimuth drives in particular, can have a regulation imprecision when they are electrically triggered by soft start devices or frequency converters at low rotational speeds, in the starting in particular, and for this reason they may not react instantaneously to load changes. Finally, the rise of the detent torque of conventionally used brake calipers, which takes place via a wedge, may last for several seconds. Through this, the load takeover by the brake calipers is delayed for the drives.

It is known to maintain a detent torque by a braking device of the adjustment drives, for instance via a pressing force of corresponding brake calipers, so that the drives traverse against a base load. In the operation of the plant, there are cases of load in which the adjustment device is driven out of the wind or braked down by the loads. For instance, in the case of an azimuth adjustment device, the moments of the attacking loads are distributed to the partial systems azimuth drive, swing bearing and brake calipers of a braking device. For the case of a conventional azimuth system, the cases of load are listed in the following table. In this, the effect on the azimuth system by the detent torque of the brake calipers of the braking device is listed in particular:

| "Load case" of the azimuth system | Azimuth drive | Brake calipers | Swing bearing | Effect to the azimuth system |
|---|---|---|---|---|
| Starting with counter-moment from the wind | Driving | Holding | Holding | More difficult to start Delayed starting The detent torque makes the starting even more difficult |
| Travelling with counter-moment from the wind | Driving | Holding | Holding | Reduced traversing speed Frequent breakdown of the rated rotational speed The detent torque makes the rotational speed behaviour worse. |
| Stopping with counter-moment from the wind | Braking | Holding | Holding | The detent torque supports the stopping procedure |
| Starting with driving moment from the wind | Driving | Holding | Holding | The detent torque protects against exceeding the rated rotational speed |
| Travelling with driving moment from the wind | Driving or braking | Holding | Holding | The detent torque protects against fluctuations of the rotational speed |
| Stopping with driving moment from the wind | Braking | Holding | Holding | The detent torque supports the stopping procedure |

A disadvantage of applying a detent torque by a braking device in the traversing of the adjustment device is increased wear of the brake, and a regular maintenance which is required through this.

From U.S. Pat. No. 5,035,575 A, the entire contents of which is incorporated herein by reference, an azimuth system of a wind energy plant is known, in which two motors of the adjustment drives are operated in opposite senses with an equal torque in the standstill of the azimuth adjustment device. Through this, a tightening of the adjustment devices in the standstill is achieved. When the azimuth system is traversed, both motors rotate then in the same sense and with the same torque. Thus, no more tightening is achieved when the adjustment device is traversed by doing so. Furthermore, from DE 103 58 486 A1, the entire contents of which is incorporated herein by reference, an azimuth drive is known for a wind energy plant which features a hydraulic device for tightening the drives. In particular, two hydraulic motors are provided in this, which engage via corresponding driving wheels in opposite rotational senses and with equal torques on the output ring gear of an azimuth joint. Thus, a clearance between the drive components is intended to be eliminated. The azimuth system can be traversed with an adjustable delivery rate by means of a second pump which is also connected to the hydraulic circuit. In the known device, a sumptuous hydraulic system is required in order to achieve a clearance elimination by two driving wheels, operated in opposite senses of rotation with respect to each other and sitting close to a toothed output wheel.

Starting from the state of the art explained above, the present invention is based on the objective to provide a method and a device of the kind mentioned in the beginning, by which a tightening of the adjustment devices is possible in a simple and inexpensive manner.

BRIEF SUMMARY OF THE INVENTION

On the one hand, the present invention resolves the objective by a method for rotating a component of the wind energy plant by traversing an adjustment device, wherein the adjustment device comprises at least two adjustment drives, each one thereof having at least one electric motor for traversing the adjustment device, and wherein during the traversing of the adjustment device, the electric motor of at least one of the at least two adjustment drives is operated at another rotational speed than the electric motor of the at least one other one(s) of the at least two adjustment drives.

The present invention also resolves the objective by an adjustment device for rotating a component of a wind energy plant by traversing the adjustment device, with at least two adjustment drives, each one thereof having at least one electric motor for traversing the adjustment device, wherein the adjustment device features a control device, which is realised to operate the electric motor of at least one of the at least two adjustment drives at another rotational speed than the electric motor of at least one other one(s) of the at least two adjustment drives during the traversing of the adjustment device.

According to the present invention, the driving torques are distributed differently to the at least two adjustment drives. In particular, the required total driving torque is essentially applied by one or more motive drives, wherein at least one drive acts against the desired rotational sense with a small counter-moment. Thus, a tightening of the drives against each other is realised. In this, the other rotational speed of the electric motor of one of the adjustment drives can be in particular an (absolutely) smaller rotational speed than the rotational speed of the other electric motor or the other electric motors, respectively, of the other adjustment drive or the other adjustment drives, respectively. However, another rotational speed can also mean that the absolute values of the rotational speeds are equal, but the rotational speeds have different signs. In this case, the electric motors are operated in different senses of rotation. Due to the difference of rotational speeds according to the present invention, a tightening of the drives against each other is achieved. In particular, the toothing of one gearbox of the adjustment drives contacts in the direction opposite to the sense of rotation. In this way, elasticities of the drives are minimised. According to the present invention, a sufficient tightening of the adjustment drives against each other is achieved in a manner which is simple with respect to construction and control technique as compared to the state of the art. In particular, this tightening is also existent in the traversing of the adjustment drives. Thus, in the load-dependent drive control with mutual tightening of the adjustment drives according to the present invention, at least one drive acts against the remaining adjustment drive or drives with its driving torque. A higher stiffness in the traversing of the adjustment devices is achieved. Moreover, in this way the moment-free ranges arising through the elasticities of the drives, the so-called torque holes, are reduced in starting and stopping processes. For instance, the acceleration which the machine house of the plant experiences when torque holes occur is damped correspondingly. In addition, accelerations caused by wind loads, which are greater than the driving torques, are avoided. Also, inadmissibly high rotational speeds of the adjustment systems are prevented, which would otherwise lead to a damage of components of the wind energy plant.

The control device of the present invention is realised to trigger the adjustment drives or electric motors, respectively, in an individual manner, in particular with desired values for rotational speed and/or torque. In this, the driving torque of the adjustment drives can be limited to a limit value, the maximum moment for which the drives are dimensioned for instance. Furthermore, the control device is realised to recognise how the total driving torque is distributed over the individual drives, and how high the real rotational speed of the adjustment system is. In this, the control device changes the desired values for rotational speed or moment of the individual drives such that the adjustment system is traversed with the desired rotational speed. From a traversing request for the adjustment device, the control device can determine the driving torque which is to be applied by the drives in total, and distribute it to the different drives or their electric motors, respectively. Subsequently, the electric motors can be triggered accordingly. In this, the control is performed such that one or plural drives act driving (motive) and at least one drive acts braking (as a generator). By the control device, the really applied torque can be measured and the rotational speeds or desired torques, respectively, of the individual drives or electric motors, respectively, can be regulated correspondingly. For performing these tasks, the control device can have a suitable analysing device.

Besides to the electric motor, each of the adjustment drives can feature a gearbox, a planetary one in particular, and optionally a braking device (an electric brake for instance) for holding the corresponding electric motor. The electric motors may be asynchronous motors (3-phase current asynchronous motors). They can be triggered by frequency converters, for instance. The electric motors have usually rotors and corresponding stators. As a consequence, the operation of the electric motors in a defined sense of rotation or with a defined rotational speed means the sense of rotation and the rotational speed of the rotors of the electric motors.

It is possible that the electric motors of the different adjustment drives are operated in opposite senses of rotation. But it is particularly preferred to operate the electric motors operated at different rotational speeds in the same sense of rotation. This embodiment is based on the finding that it is sufficient for an effective tightening of the drives when one of the drives is in fact operated in the same direction as the remaining drives, but with a smaller rotational speed. In this way, a sufficient tightening is achieved in a manner which is particularly gentle for the drives. By pre-setting such different desired rotational speeds in the triggering of the electric motors of the adjustment drives, one of the electric motors is quasi in a lag with respect to the remaining motors, and provides the tightening in this way. In particular, there is a slippage between the electric motors. In doing so, all the electric motors of all the adjustment drives can be operated in the same sense of rotation.

A moment regulation is preferably performed such that the respective adjustment drive(s) or electric motor(s), respectively, do not exceed a preset desired driving torque, and that adjustment drive or electric motor, respectively, which is operated at another rotational speed, a smaller one in particular, acts only with a fraction of the desired driving torque against the driving action of the remaining adjustment drive(s) or electric motor(s), respectively. Thus, the counteracting torque cannot damage the adjustment drives and is in the permanently sustainable range of the gearbox. As a consequence, curtailings of the lifespan have not to be feared. According to one embodiment, in the traversing of the adjustment device, the adjustment drive featuring the electric motor operated at a different rotational speed can apply a torque directed against the driving torque of the at least one other adjustment drive of 5 to 10% of the driving torque of the at least one other adjustment drive. For instance, when each drive applies a rated moment of 100 Nm, the electric motor or adjustment drive, respectively, which is operated at the lower rotational speed, can apply a counter-moment of 5 to 10 Nm. According to a further embodiment, there can be a difference in rotational speed of 20 to 100 rotations per minute (rpm) between the electric motor operated at a different rotational speed, a lower one in particular, and the electric motor of the other adjustment drive or adjustment drives, respectively.

In principle, the present invention can be applied to all the adjustment devices in which there are elasticities and a tightening is therefore desirable. However, in a manner particularly suited for practice, the component can be a machine house of the wind energy plant and the adjustment device an azimuth adjustment device. Then, the machine house of the plant can be rotated around the longitudinal axis of the plant by the adjustment device. In this way it is possible for the rotor of the plant to follow the wind, and to untwist the cable loop between machine house and tower from time to time. But it is also possible that the component is a rotor blade of the wind energy plant, and the adjustment device a blade pitch angle adjustment device. In this case, the blade pitch angle of the rotor blades of the plant can be adjusted through the adjustment device by rotating the rotor blades around their longitudinal axis.

According to one embodiment, the adjustment device can feature more than two adjustment drives, three or more adjustment drives in particular, each one of them having at least one electric motor. It is then possible that the electric motors of more than two adjustment drives, of all the adjustment drives of the adjustment device in particular, are operated in the same sense of rotation during the traversing of the adjustment device, and that the electric motor of at least one of the more than two adjustment drives is operated at a lower rotational speed than the electric motors of the other ones of the more than two adjustment drives. Thus, in this embodiment, one motor in particular of an adjustment drive is operated at a lower rotational speed than the electric motors of the remaining adjustment drives. In this, the electric motors of the other adjustment drives can be operated at the same rotational speed.

According to a further embodiment, the electric motor or the electric motors, respectively, of the other adjustment drive or the other adjustment drives, respectively, can be operated at the rated rotational speed for traversing the adjustment device. Thus, in this embodiment, the electric motors of all the adjustment drives in particular are operated at rated rotational speed, except that one having the lower rotational speed and acting as a generator through this.

At high loads acting against the traversing movement of the adjustment device, the rotational speed of the at least one electric motor operated at a lower rotational speed can be increased. Thus, in this embodiment, at strong wind acting against the sense of rotation, the electric motor operated with the lower rotational speed, but in the same sense of rotation as the remaining electric motors, can also be operated at rated rotational speed, in order to support the remaining drives in the traversing of the adjustment device against the wind. Thus, the electric motor operated at lower rotational speed represents a power- and moment reserve which can be requested when needed. The total driving torque of the drives of the adjustment device is dimensioned such that all the drives together can safely traverse with maximum moment against the maximum occurring loads. The control device can feature a load measurement device, a wind measurement device for instance. When a limit load is exceeded, the control device can then increase the rotational speed of the braking electric motor which effects the tightening.

In a standstill of the adjustment device, the electric motors of at least two azimuth drives can be triggered in opposite senses of rotation, but with a rotational speed not equal to zero, such that the adjustment drives do not exert any torque on the adjustment device altogether. Thus, in this case a tightening and a holding of the adjustment device is attained even in a standstill of the adjustment devices. As a consequence, the holding/service brake usually situated on the fast shaft of the drive train of the wind energy plant can be omitted, because the adjustment drives are permanently in the follow-up operation and fix the adjustment system at standstill. In particular, the electric motors of two different adjustment drives can be operated in opposite senses of rotation but with the same moment in this, and the electric motors of the remaining adjustment drives can be not operated at all (rotational speed zero).

Due to the tightening of the adjustment drives in the manner of the present invention, it is furthermore possible that during the traversing of the adjustment device, no detent torque is exerted on the adjustment device by a braking device. Instead, this detent torque can be replaced by the tightening of the drives. As a consequence, the traversing of the adjustment device proceeds in a damped way, and a reduced wear and less necessity of maintenance result from this. In addition, the total driving torque to be applied by all the drives in common can be dimensioned smaller than when a detent torque is provided in the traversing. With a sufficient driving torque of the adjustment drives, even the braking device usually providing the detent torque (in the case of an azimuth adjustment device the brake disc and the brake calipers) can be omitted in principle. Admittedly, for starting and maintenance purposes, and also for the case of a grid breakdown, a device for arresting and holding, respectively, must be provided for the adjustment device. In this, those loads must be taken as a base which act on a wind energy plant which is in the spinning operation. Such a holding device has not to arrest rigidly when this is not demanded for safety reasons, but it may slip through when a limit load is exceeded. Inasmuch as the adjustment device features a conventional brake device nevertheless, the same can be kept unactuated during the traversing of the adjustment device, the brake calipers kept in the opened condition for instance.

In order to make the wear of the adjustment drives uniform over their lifespans, electric motors of different adjustment drives are operated in an alternating manner at the other rotational speed, the lower one in particular. A change from one adjustment drive to another adjustment drive can be performed in particular after the decay of a parametrisable time, or after reaching a parametrisable number of traversing procedures of the adjustment device. Thus, a cyclic change between the drives with respect to their braking functions is possible. As the transition time between different adjustment drives, a point in time between two yawing processes can be used, in which the sum of all driving torques is zero. In particular, the adjustment drives can have the same driving torque at the rated rotational speed of the electric motors. However, as an alternative it is also possible to operate only the same drive or electric motor, respectively, with the lower rotational speed. For instance, the same can then have a smaller driving torque than the remaining (main-) drives.

Due to the lag with respect to the remaining motors, the electric motor operated at a lower rotational speed in the traversing of the adjustment device acts as a generator, whereas the remaining electric motors act motive. According to an embodiment particularly suited for practice, the electric energy, recovered from the electric motor operated at a lower rotational speed and acting as generator, can therefore be fed into an electric grid of the wind energy plant. For this purpose, a suitable feeding device may be provided. Thus, in this embodiment there is a recovery into the plant system of the energy consumed by tightening the adjustment drives.

The apparatus of the present invention can be suited for performing the method of the invention.

BRIEF DESCRIPTION OF THE SEVERAL FIGURES OF THE DRAWINGS

An example of the realisation of the present invention is explained in more detail by means of drawings in the following. Schematically shown is in:

FIG. 1 an azimuth adjustment system with an adjustment device according to the present invention according to a first embodiment, in a cross section.

Figure 2:
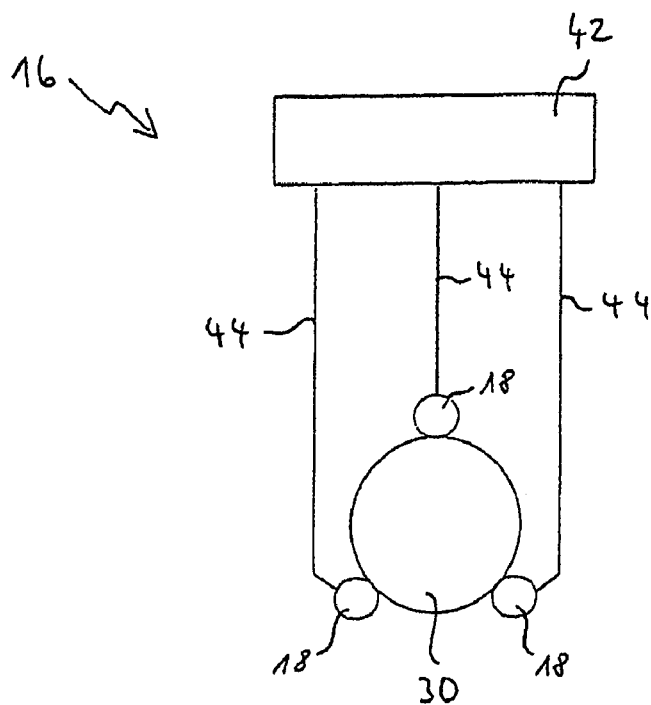
Figure 3:
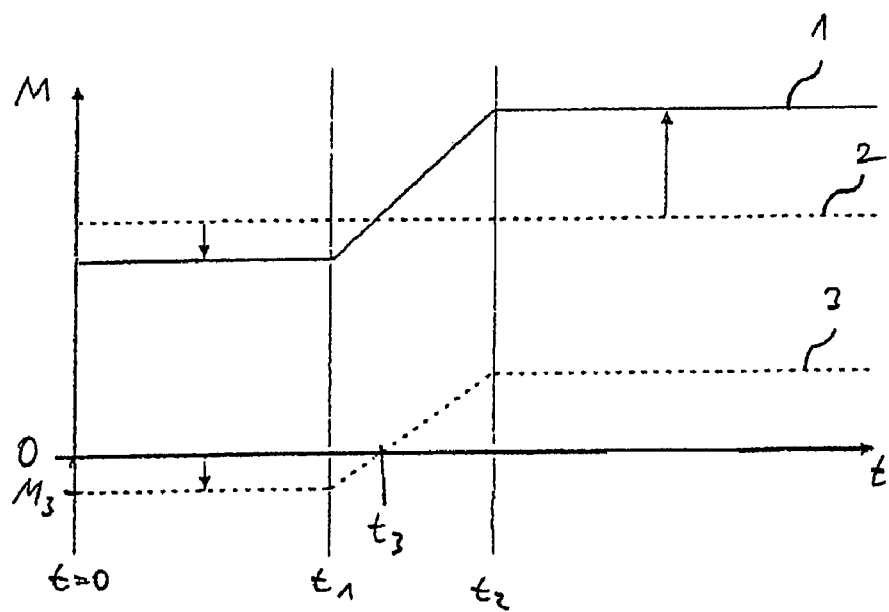

FIG. 2 a depiction of the adjustment device according to the present invention, and FIG. 3 a diagram for illustrating the function of the adjustment device according to the present invention.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated As far as not indicated otherwise, equal reference signs designate equal objects in the figures. In FIG. 1, an azimuth system of the wind energy plant with an adjustment device 16 according to the present invention is schematically shown, an azimuth adjustment device 16 in the depicted example. Of course, another adjustment system with another adjustment device, a blade pitch angle adjustment device for instance, could be provided as well. In the depicted example, the adjustment device 16 has three adjustment drives 18, presently azimuth adjustment drives 18, one of which can be recognised in FIG. 1. The adjustment device 16 serves for rotating a machine house of the wind energy plant. In particular, a machine carrier 10 of the machine house of the plant, not depicted in detail, is shown. At the nacelle side, the machine carrier 10 carries in a per se known manner a not depicted generator and an also not depicted drive train with the rotor of the wind energy plant. In the example, the rotor features three rotor blades. The machine carrier 10 and with it the machine house are rotatably mounted on the tower 12, which is depicted in cut-outs. The rotation of the machine house around the longitudinal axis of the tower 12 takes place in a per se known manner via an azimuth swing bearing 14.

The azimuth drives 18 each have an electric motor 20, triggered by means of a not depicted frequency converter in a per se known manner, presently a three-phase current asynchronous motor 20. The electric motor 20 acts on a shaft, whose rotational axis is designated with 22. The adjustment device 16 has furthermore a plural step planetary gearbox 24. The electric motor 20 is positively connected to the fast shaft of the gearbox 24 acting as a torque converter. The slow output shaft 26 of the gearbox 24 features a pinion 28, which meshes from the exterior with an outside-toothed azimuth pivot bearing 30. A brake disc 32 is arranged on the azimuth bearing 30 at the outside in the depicted example, which is partly overlapped by brake calipers 34. In the depicted example, the brake calipers are actuated hydraulically via a central hydraulic unit, which is arranged on the machine carrier 10 at the nacelle side. The brake disc 32 with the brake calipers 34 is a part of a braking device 31. Furthermore, the azimuth adjustment device 16 has an electric holding brake 36, assigned to each one of the adjustment drives 18 at a time, for holding the asynchronous motor 20. The holding brake 36 has a brake disk 38, connected to the fast shaft of the gearbox 24, as well as brake calipers 40 acting on the brake disk 38.

In order to rotate the machine house of the wind energy plant, the azimuth adjustment device 16 is traversed by actuating the azimuth adjustment drives 18, and the electric motors 20 of the azimuth drives 18 in particular, with a defined rotational speed. Via the planetary gearbox 24, this rotation movement of the electric motors 20 is transformed into a slower rotation movement of the slow shaft 26. Through the movement of the shaft 26, the pinion 28 is also moved in a corresponding manner. The same transfers its rotation movement to the toothing of the azimuth bearing 30 meshing with it. As a consequence, a rotation of the machine house around the longitudinal axis of the plant tower 12 takes place via the azimuth swing bearing 14.

Furthermore, the azimuth adjustment device 16 has a control device 42, which can trigger the electric motors 20 of the adjustment drives 18 of the adjustment device 16 via a line 44. This is also depicted schematically in FIG. 2. In particular, desired rotational speeds and/or desired torques can be preset to the electric motors 20 of the adjustment drives 18 by the control device 42. In this, the respective driving torques applied by the adjustment drives 18 can be determined by the control device 42. In a traversing request for the azimuth system, through an individual triggering of the electric motors 20, the control device 42 can distribute the overall driving torque to be applied by the adjustment drives 18 over the drives 18. In particular, for traversing the azimuth adjustment device, the electric motors 20 of two of the three adjustment drives 18 are triggered by the control device 42 into the same sense of rotation and to equal rotational speed in the depicted example. At the same time, the electric motor 20 of the third adjustment drive 18 is also operated in the same sense of rotation as the electric motors 20 of the remaining drives 18, but with a lower rotational speed. This has the effect that the more slowly operated electric motor 20, and with it the corresponding adjustment drive 18, lags behind the two other electric motors 20 and adjustment drives 18, respectively. Thus, a tightening of the drives 18 and an avoidance of undesired elasticities is achieved. Due to the tightening, a detent torque usually applied in the state of the art by the braking device 31 through the brake calipers 34 when the azimuth adjustment device 16 is traversed, is no more necessary.

Also, for instance in a standstill of the adjustment device 16, the electric motors 20 of two adjustment drives 18 can be operated in opposite senses of rotation and at equal rotational speed, the electric motor 20 of the third adjustment drive 18 being no more actuated in doing so. In the depicted example, the adjustment drives 18 exert the same driving torque at equal rotational speed of their electric motors 20. Insofar, holding the azimuth system is achieved in this embodiment even in a standstill of the adjustment device 16. The braking device 31 is not obligatorily necessary also before this background. However, it may be provided for purposes of maintenance and starting.

The result of the triggering of the adjustment drives 18 according to the present invention is to be explained by means of the diagram depicted in FIG. 3. In the diagram, the torque M is plotted over the time t. The curve 1 describes the driving torque applied to the azimuth swing bearing by the three adjustment drives 18 in common. The curve 2 describes the constant driving torque applied in total by the two adjustment drives 18 operated at rated rotational speed and in the same sense of rotation. The curve 3 describes the driving torque applied by the electric motor 20 of the third adjustment drive 18.

In FIG. 3, it can be recognised that the common torque applied by the drives 18 operated at rated rotational speed is constant (curve 2). From on the points in time t=0 up to $t_1$, the electric motor 20 of the third adjustment drive 18 is operated at a lower rotational speed than the electric motors 20 of the two other adjustment drives 18. Correspondingly, a braking action and thus a negative driving torque $M_3$ is exerted by the more slowly operated electric motor 20 or the corresponding adjustment drive 18, respectively. Correspondingly, the driving torque applied by the three adjustment drives 18 in common (curve 1) decreases also for $M_3$ between the points in time t=0 and $t_1$. In the point of time $t_1$, strong wind loads acting against the traversing direction of the azimuth system are detected by the control device 42, and in particular by a wind measurement device associated to the same. In order to support the two adjustment drives 18 traversing at rated rotational speed, the rotational speed of the electric motor 20 operated at lower rotational speed is therefore increased by the control device 42. In particular, there is a linear increase of the rotational speed and with this of the driving torque exerted by this adjustment drive 18 from on the point in time $t_1$ up to the point in time $t_2$. In the point in time $t_3$, the transition of the corresponding electric motor 20 from the generator operation to the motive operation takes place. The driving torque applied by all the drives in common (curve 1) increases correspondingly. In the point in time $t_2$, the rotational speed of the electric motor 20 of the originally more slowly operated adjustment drive 18 is increased no more, but is kept on a constant level. Correspondingly, even the driving torque applied by all the drives in common (curve 1) remains on this increased moment level. In this way, it can be safely traversed even against strong wind loads.

By way of example, the following table shows the modes of operation of the three adjustment drives 18 in different load situations:

| "Load case" of the azimuth system | Azimuth drive 1 | Azimuth drive 2 | Azimuth drive 3 |
|---|---|---|---|
| Starting with counter-moment from the wind | Driving | Driving | Driving |
| Travelling with counter-moment from the wind | Driving | Driving | Driving or braking |
| Stopping with counter-moment from the wind | Braking | Braking | Driving or braking |
| Starting with driving moment from the wind | Driving | Driving | Braking |
| Travelling with driving moment from the wind | Driving or braking | Driving or braking | Braking |
| Stopping with driving moment from the wind | Braking | Braking | Braking |

After the decay of a parametrisable period of time, another one of the three electric motors 20 of the adjustment drives 18 can be used for the tightening by the control device 42, for instance be operated at a lower rotational speed. By such a cyclic change between the adjustment drives 18, the wear is made more uniform over their lifespan. Furthermore, a feeding device not depicted in more detail may be provided, by which the energy recovered by the electric motor 20, operated at the lower rotational speed in the traversing of the adjustment devices 16 and acting as a generator, is fed back into the electric grid of the wind energy plant.

Due to the tightening achieved according to the present invention, the present invention invites its use at plant locations in particular which are exposed to a strong and changing wind.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method for rotating a component of a wind energy plant by traversing an adjustment device (16), wherein the adjustment device (16) comprises at least two adjustment drives (18), each one thereof having at least one electric motor (20), for traversing the adjustment device (16), characterised in that during the traversing of the adjustment device (16), the electric motor (20) of at least one of the at least two adjustment drives (18) is operated at another rotational speed than the electric motor (20) of at least one other of the at least two adjustment drives (18).

2. A method according to claim 1, characterised in that the electric motors (20) operated at different rotational speeds are operated in the same sense of rotation.

3. A method according to claim 1, characterised in that in the traversing of the adjustment device (16), the adjustment drive (18) featuring the electric motor (20) operated at a different rotational speed applies a torque directed against the driving torque of the at least one other adjustment drive of 5 to 10% of the driving torque of the at least one other adjustment drive.

4. A method according to claim 1, characterised in that there is a difference in rotational speed of 20 to 100 rotations per minute between the electric motor (20) operated at a different rotational speed and the electric motor (20) of the at least one other adjustment drive (18).

5. A method according to claim 1, characterised in that the component is a machine house of the wind energy plant and that the adjustment device (16) is an azimuth adjustment device (16).

6. A method according to claim 1, characterised in that the component is a rotor blade of the wind energy plant, and that the adjustment device (16) is an adjustment device for the blade angle pitch.

7. A method according to claim 1, characterised in that the adjustment device (16) features more than two adjustment drives (18), each one of them having at least one electric motor (20).

8. A method according to the claim 2, characterised in that the electric motors (20) of more than two adjustment drives (18) are operated in the same sense of rotation during the traversing of the adjustment devices (16), and that the electric motor (20) of at least one of the more than two adjustment drives (18) is operated at a lower rotational speed than the electric motors (20) of the other ones of the more than two adjustment drives (18).

9. A method according to claim 8, characterised in that the electric motors (20) of the other adjustment drives (18) are operated at the same rotational speed.

10. A method according to claim 1, characterised in that the electric motor (20) or the electric motors (20), respectively, of the other adjustment drive (18) or the other adjustment drives (18), respectively, is or are operated at the rated rotational speed for traversing the adjustment device (16).

11. A method according to claim 2, characterised in that at high loads acting against the traversing movement of the adjustment device (16), the rotational speed of the at least one electric motor (20) operated at a lower rotational speed is increased.

12. A method according to claim 1, characterised in that at standstill of the adjustment device (16), the electric motors (20) of at least two adjustment drives (18) are triggered in opposite senses of rotation, but with a rotational speed not equal to zero, such that the adjustment drives (18) do not exert any torque on the adjustment device (16) altogether.

13. A method according to claim 1, characterised in that during the traversing of the adjustment device (16), no detent torque is exerted on the adjustment device (16) by a braking device.

14. A method according to claim 1, characterised in that electric motors (20) of different adjustment drives (18) are operated at the other rotational speed in an alternating manner.

15. A method according to claim 1, characterised in that electric energy, recovered from the electric motor (20) operated at a lower rotational speed in the traversing of the adjustment device (16) and acting as a generator, is fed into an electric grid of the wind energy plant.

16. An adjustment device for rotating a component of a wind energy plant by traversing the adjustment device (16), with at least two adjustment drives (18), each one thereof having at least one electric motor (20), for traversing the adjustment device (16), characterised in that the adjustment device (16) has a control device (42), which is realised to operate the electric motor (20) of at least one of the at least two adjustment drives (18) at another rotational speed than the electric motor (20) of at least one other of the at least two adjustment drives (18) during the traversing of the adjustment device (16).

17. An adjustment device according to claim 16, characterised in that the control device (42) is realised to operate the electric motors (20) operated at different rotational speeds in the same sense of rotation.

18. An adjustment device according to claim 16, characterised in that the control device (42) is realised to trigger the adjustment drives such that the adjustment drive (18) featuring the electric motor (20) operated at a different rotational speed applies a torque directed against the driving torque of the at least one other adjustment drive of 5 to 10% of the driving torque of the at least one other adjustment drive in the traversing of the adjustment device (16).

19. An adjustment device according to claim 16, characterised in that the control device (42) is realised to trigger the adjustment drives such that there is a difference in rotational speed of 20 to 100 rotations per minute between the electric motor (20) operated at a different rotational speed and the electric motor (20) of the at least one other adjustment drive (18).

20. An adjustment device according to claim 16, characterised in that the component is a machine house of the wind energy plant and that the adjustment device (16) is an azimuth adjustment device (16).

21. An adjustment device according to claim 16, characterised in that the component is a rotor blade of the wind energy plant, and that the adjustment device (16) is an adjustment device for the blade angle pitch.

22. An adjustment device according to claim 16, characterised in that the adjustment device (16) features more than two adjustment drives (18), each one of them having at least one electric motor (20).

23. An adjustment device according to claim 16, characterised in that the control device (42) is realised to operate electric motors (20) of more than two adjustment drives (18) in the same sense of rotation during the traversing of the adjustment device (16), and to operate the electric motor (20) of at least one of the more than two adjustment drives (18) at a lower rotational speed than the electric motors (20) of the other ones of the more than two adjustment drives (18).

24. An adjustment device according to claim 23, characterised in that the control device (42) is realised to operate the electric motors (20) of the other adjustment drives (18) at the same rotational speed.

25. An adjustment device according to claim 16, characterised in that the control device (42) is realised to operate the electric motor (20) or the electric motors (20), respectively, of the other adjustment drive (18) or the other adjustment drives (18), respectively, at the rated rotational speed for traversing the adjustment device (16).

26. An adjustment device according to claim 17, characterised in that at high loads acting against the traversing movement of the adjustment device (16), the rotational speed of the at least one electric motor (20) operated at a lower rotational speed can be increased by the control device (42).

27. An adjustment device according to claim 16, characterised in that the control device (42) is realised to trigger the electric motors (20) of at least two adjustment drives (18) in opposite senses of rotation, but with a rotational speed not equal to zero at standstill of the adjustment device (16), such that the adjustment drives (18) do not exert any torque on the adjustment device (16) altogether.

28. An adjustment device according to claim 16, characterised in that the adjustment device (16) features no braking device exerting a detent torque on the adjustment device (16) during the traversing of the adjustment device (16).

29. An adjustment device according to claim 16, characterised in that electric motors (20) of different adjustment drives (18) can be operated at the other rotational speed by the control device (42) in an alternating manner.

30. An adjustment device according to claim 16, characterised in that it features a feeding device, by which electric energy, recovered from the electric motor (20) operated at a lower rotational speed in the traversing of the adjustment device (16) and acting as generator, can be fed into an electric grid of the wind energy plant.

\* \* \* \* \*